June 23, 1953 — A. C. LA BORE — 2,642,796
HOLDER FOR ROASTING FRANKFURTERS, CORN ON COB, AND THE LIKE
Filed May 23, 1950
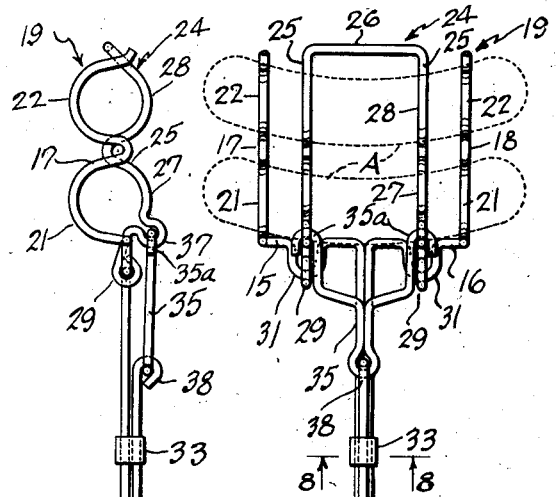
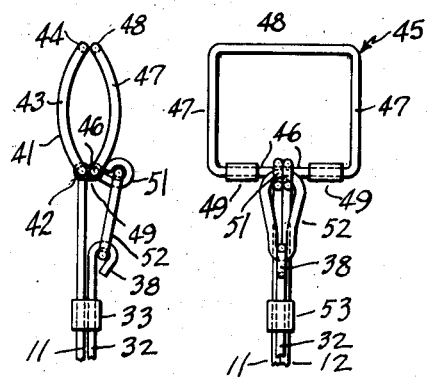
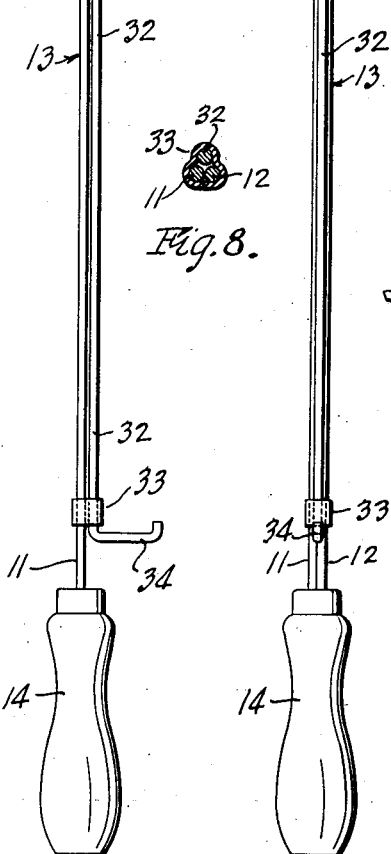
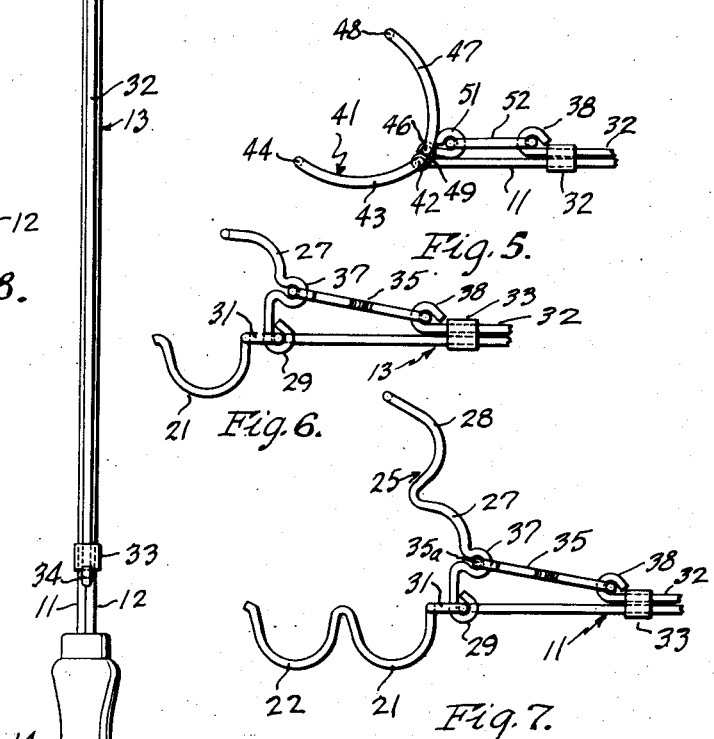
Fig. 1. Fig. 2. Fig. 3. Fig. 4. Fig. 5. Fig. 6. Fig. 7. Fig. 8.
Inventor
Anthony C. La Bore
Wooster & Davis, Attorneys Patented June 23, 1953

2,642,796

UNITED STATES PATENT OFFICE 2,642,796

HOLDER FOR ROASTING FRANKFURTERS, CORN ON COB, AND THE LIKE

Anthony C. La Bore, Bridgeport, Conn.

Application May 23, 1950, Serial No. 163,693

1 Claim. (Cl. 99—441)

This invention relates to cooking utensils such as are frequently employed, for example, in cooking or roasting food over an outdoor grill, an open fire, or the like, and an object is to provide a utensil of this type having improved features of construction and operation.

A particular object is to provide a device of this character which is especially adapted for gripping and holding elongated round objects such, for example, as frankfurters and ears of corn, during the cooking or roasting operation, and also are adapted to function as tongs to grip and pick up such articles.

A further object is to provide an improved cooking utensil having easily operated article-gripping jaws arranged to support an article not only when the jaws are closed in gripping position, but also when they are open in nongripping position, thereby greatly simplifying and facilitating the removal of a cooked article from the utensil.

A further object is to provide an improved cooking utensil of the type described constructed of inexpensive material and forming a strong, durable product.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a side elevation of a cooking utensil constructed in accordance with one embodiment of the invention, showing the same provided with gripping jaws arranged to hold a plurality of articles to be cooked such, for example, as frankfurters, or the like;

Fig. 2 is a front elevation of the utensil shown in Fig. 1;

Fig. 3 is a view similar to Fig. 1 showing a further embodiment of the invention;

Fig. 4 is a front view of the device shown in Fig. 3;

Fig. 5 is a view similar to Fig. 3 illustrating the gripping jaws in open position;

Fig. 6 is a side elevation of a pair of single gripping jaws similar to those shown in Figs. 1 and 2, with the jaws in open position;

Fig. 7 is a similar view showing the double gripping jaws of the embodiment of Figs. 1 and 2, and Fig. 8 is a detail section substantially on line 8—8 of Fig. 2.

In the illustrated embodiments of the invention, a pair of parallel wires 11, 12 are secured together in the manner hereafter described to form an elongated shank 13 having a handle 14 of wood or other suitable non-heat-conducting material secured to one end. At the other end the utensil has article gripping jaws which can be easily manipulated and controlled from the handle end of the shank.

In the embodiment illustrated in Figs. 1, 2 and 7, the wires 11, 12 are bent outwardly in opposite directions to form outwardly extending arms 15, 16, and are then bent forwardly in parallel to the shank 13 and to each other to provide spaced ends 17, 18 which form a relatively stationary jaw member 19. As illustrated in Figs. 1, 2 and 7, the spaced, jaw-forming ends 17, 18 of the wires are shaped to provide two concave recesses 21, 22 for carrying and holding a plurality of articles to be cooked such, for example, as the frankfurters shown in broken lines in Fig. 2, or they could be ears of corn or the like.

A movable jaw 24 is adapted to cooperate with the stationary jaw and to be controlled from the handle 14. As illustrated in Figs. 1, 2 and 7, the movable jaw 24 is formed by a U-shaped member, which may be wire similar to the wire used in forming the shank 11 and the stationary jaw member 19, having side arms 25 connected by a cross arm 26 and formed to provide two concave recesses 27, 28 in each arm 25 opposite to but not necessarily in alignment with and adapted to cooperate with the recesses 21, 22 in the stationary jaw member 19 to hold separate articles A as illustrated in dotted lines. The inner ends of the arms 25 are formed with eyes 29 loosely surrounding the outwardly extending arms 15, 16 on the shank 13 for movement into and out of article gripping engagement. As illustrated, the eyes 29 surround the arms 15, 16 at the bottoms of loops or off-sets 31 formed in each arm 15, 16 about midway of the length thereof. The loops 31 provide means for holding the side arms 25 of the movable jaw 24 against lateral displacement.

The illustrated mechanism for operating and controlling the movable jaw 24 includes a push rod 32 slidably connected to the shank 13 by spaced clips 33 which surround the shank-forming wires 11, 12 and which also secure the wires together. Adjacent the handle 14, the end of the rod 32 is bent outwardly at a right angle to provide a finger grip 34 by means of which the rod can be slid longitudinally of the shank 13 by the thumb or forefinger of the same hand that is employed to hold the handle 14, thus leaving the other hand free. The opposite end of the rod 32 is operatively connected to the movable jaw 24 by a U-shaped link 35, for example, loosely connecting an eye 37 in each arm 25 of the movable jaw member 24, to an eye 38 on the adjacent end of the rod 32. As shown, the end 35a of each arm of the U-shaped link 35 is curved through the adjacent eye 37 to form a pivotal connection therewith.

A further embodiment of the invention is illustrated in Figs. 3, 4 and 5, in which a relatively stationary jaw 41 is formed by bending the wires 11, 12 to provide outwardly extending arms 42, similar to the arms 15, 16 in Fig. 2, side arms 43 extending parallel to each other and to the shank 13, and a cross arm 44 connecting the outer ends of the parallel arms 43. The side arms 43 are curved as shown in Fig. 5, to provide a concave gripping surface adapted to cooperate with a concave, relatively movable jaw 45 formed by a wire frame having outwardly extending arms 46, side arms 47 which are curved to complement the side arms 43 of the stationary jaw 41, and an outer cross arm 48 connecting the outer ends of the parallel arms 47 and adapted to approach the cross arm 44 on the stationary jaw 41 when the jaws are closed. The movable jaw 45 is hinged to the stationary jaw in any suitable manner. As shown, hinge clips 49 surround the side arms 42, 46 of the respective jaw members. The inner ends of the arms 46 on the movable member 45 are each bent to form adjacent eyes 51 which are connected to the eye 38 on the end of the push rod 32 by a link 52. This device is also especially adapted for gripping and holding round elongated articles, such, for example, as ears of corn, but is also adapted for such articles as frankfurters and the like.

It will be noted that a utensil constructed in accordance with the present invention has shank and jaw portions which can be easily made from relatively inexpensive wire such, for example, as cold rolled steel wire. In the embodiment shown in Figs. 3 and 4, the stationary jaw and the shank are all formed from a single piece of wire to provide an integral unit. In both embodiments, the movable jaw is also preferably formed from a single wire.

The invention is suitable for holding any desired article for cooking over an outdoor grill, an open fire, or the like. When the jaws are formed as shown in Figs. 1 and 2, a plurality of such articles as frankfurters, for example, can be simultaneously cooked. If desired, the jaws can be provided with additional recesses for holding any desired number of frankfurters or other articles. When the jaws are formed as shown in Figs. 3, 5 and 6, a single article can be cooked, such as an ear of corn. In the embodiment shown in Figs. 3, 4 and 5, the movable jaw is manipulated by the same hand that grasps the handle 14, in the same manner as above described in connection with the embodiment shown in Figs. 1 and 2, leaving the other hand free to place articles between the jaws or remove them therefrom. The concave or recessed configuration of the jaws permits supporting articles on the stationary jaw when the jaws are open as well as closed, and thus facilitates use of the utensils with frankfurters, ears of corn, and similar articles. It can also be used as tongs for gripping and picking up the articles.

The invention can be variously modified and adapted within the scope of the appended claim.

What is claimed is:

A cooking utensil comprising a pair of substantially parallel wires secured together forming an elongated shank, a hand grip at one end of the shank, the wires at the other end of the shank being bent laterally and outwardly in opposite directions forming aligned arms on opposite sides of the shank, said wires being then extended forwardly at the outer ends of the arms in the general direction of the shank and curved to form laterally spaced concave gripping members of a stationary jaw, said arms being offset outwardly of the shank to form pivot loops, a wire forming a movable jaw including laterally spaced connected side members curved to form concave gripping members opposed to the stationary jaw, said members of the movable jaw provided with eyes embracing said pivot loops to pivotally connect the movable jaw thereto, said members of the movable jaw also bent to form eyes outwardly of said pivotal connections, an operating rod extending along the shank provided with a finger grip adjacent the hand grip, and a forked link including spaced connected side members pivotally connected at an intermediate point to the other end of the rod and provided with eyes at their free ends extending through the latter eyes of the movable jaw to pivotally connect the link thereto for operating the movable jaw.

ANTHONY C. LA BORE.

References Cited in the file of this patent

UNITED STATES PATENTS

| Number | Name | Date |
| --- | --- | --- |
| 26,393 | Dunbar | Dec. 6, 1859 |
| 390,331 | Anable | Oct. 2, 1888 |
| 567,791 | Paschen | Sept. 15, 1896 |
| 1,013,144 | Fellows | Jan. 2, 1912 |
| 1,945,165 | Smith | Jan. 30, 1934 |
| 2,102,818 | Rhew | Dec. 21, 1937 |
| 2,425,799 | Hamilton | Aug. 19, 1947 |
| 2,486,496 | Romazon | Nov. 1, 1949 |
| 2,491,594 | Williams | Dec. 20, 1949 |